US010132497B2

(12) United States Patent
Reiff et al.

(10) Patent No.: US 10,132,497 B2
(45) Date of Patent: Nov. 20, 2018

(54) GENERATOR WITH VENT EXTENSION

(71) Applicant: SNOW SHIELD, LLC, Kings Park, NY (US)

(72) Inventors: Edward Reiff, Kings Park, NY (US); Andrew Reiff, Kings Park, NY (US); John Conley, Bellport, NY (US)

(73) Assignee: SNOW SHIELD, LLC, Kings Park, NY (US)

( * ) Notice: Subject to any disclaimer, the term of this patent is extended or adjusted under 35 U.S.C. 154(b) by 368 days.

(21) Appl. No.: 15/216,127

(22) Filed: Jul. 21, 2016

(65) Prior Publication Data

US 2018/0023808 A1    Jan. 25, 2018

(51) Int. Cl.
| | | |
|---|---|---|
| *F23J 11/08* | (2006.01) | |
| *H02K 7/18* | (2006.01) | |
| *F23J 13/04* | (2006.01) | |
| *H02K 5/20* | (2006.01) | |

(52) U.S. Cl.
CPC ............ *F23J 11/08* (2013.01); *F23J 13/04* (2013.01); *H02K 7/1815* (2013.01); *F23J 2213/20* (2013.01); *F23J 2213/203* (2013.01); *H02K 5/20* (2013.01)

(58) Field of Classification Search
CPC .................................. F23J 11/08; F23J 13/04
USPC .................... 126/312; 454/284, 366
See application file for complete search history.

(56) References Cited

U.S. PATENT DOCUMENTS

| | | | | |
|---|---|---|---|---|
| 4,481,871 A | * | 11/1984 | Efstratis .................. | F16L 27/12 403/363 |
| 4,836,086 A | * | 6/1989 | Cecconi .................. | E01H 13/00 239/14.1 |
| 4,967,646 A | * | 11/1990 | Brown ...................... | F24D 5/00 454/289 |
| 7,022,011 B1 | * | 4/2006 | Rickman ................. | F24F 13/02 454/306 |
| 7,766,734 B2 | * | 8/2010 | Dietz ................... | F24F 11/0001 454/345 |
| 8,382,008 B1 | * | 2/2013 | Ricciardi ................. | A61L 2/22 239/102.2 |
| 8,446,023 B2 | * | 5/2013 | Takita ..................... | F02B 63/04 180/68.2 |
| 9,684,441 B2 | * | 6/2017 | Moiseenko ........... | G11B 27/105 |
| 2016/0193635 A1 | * | 7/2016 | Mate .................. | B23K 37/0461 454/63 |

* cited by examiner

*Primary Examiner* — Gregory Huson
*Assistant Examiner* — Nikhil Mashruwala
(74) *Attorney, Agent, or Firm* — Moritt Hock & Hamroff LLP; Bret P. Shapiro

(57) ABSTRACT

Technologies are described for vent extension systems. The systems may comprise a first extension attached to an intake vent, a second extension attached to an exhaust vent, and a third extension attached to an alternator vent of a generator housing. The first and second extensions may include a first upper section including a first and second end and a bend; and a first lower section including a first and second end and a bend. The first end of the first lower section may be configured to connect to the second end of the first upper section. The third extension may include a second upper section including a first and second end and a bend; and a second lower section including a first and second end and a bend. The first end of the second lower section may be configured to connect to the second end of the second upper section.

13 Claims, 2 Drawing Sheets

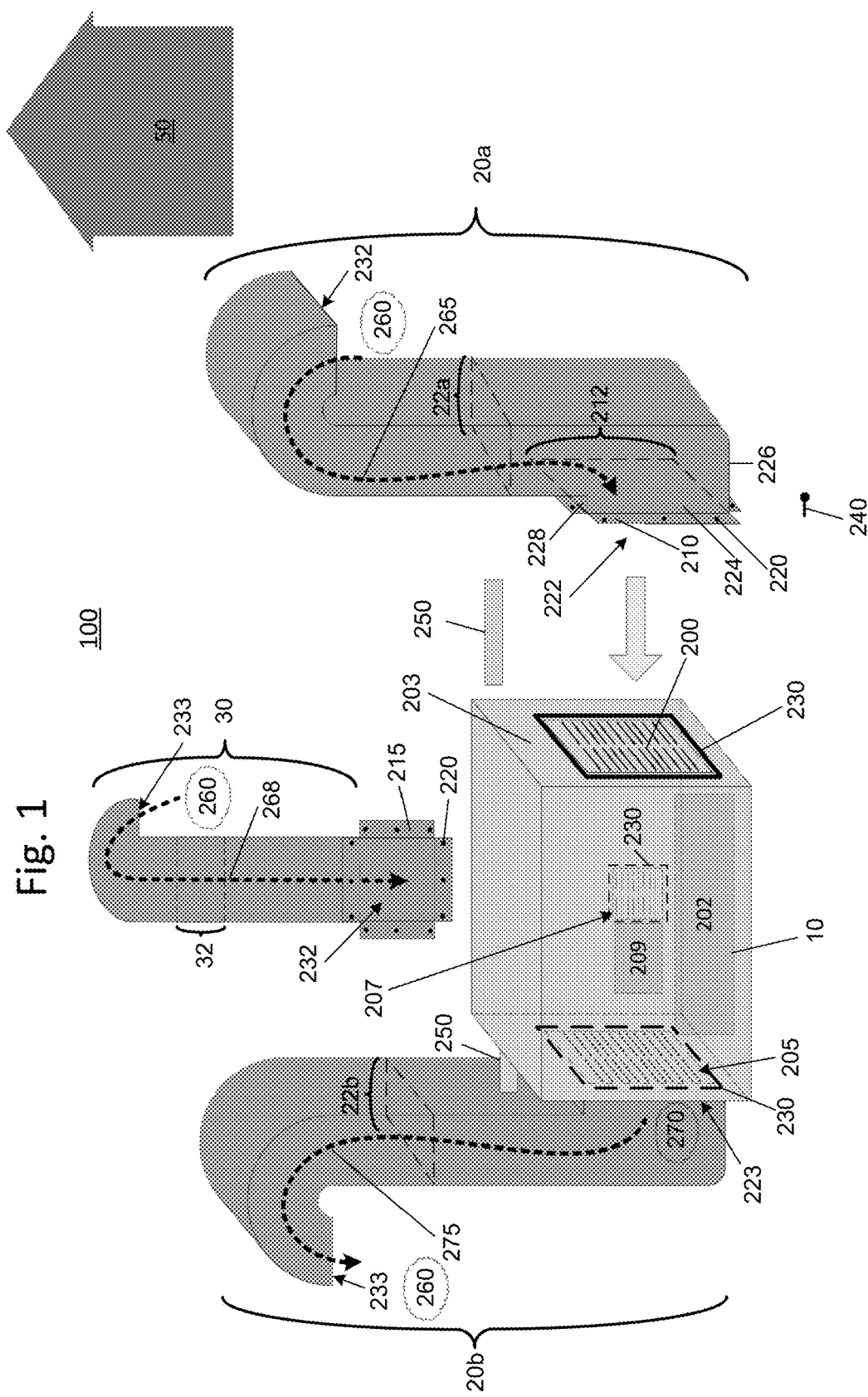

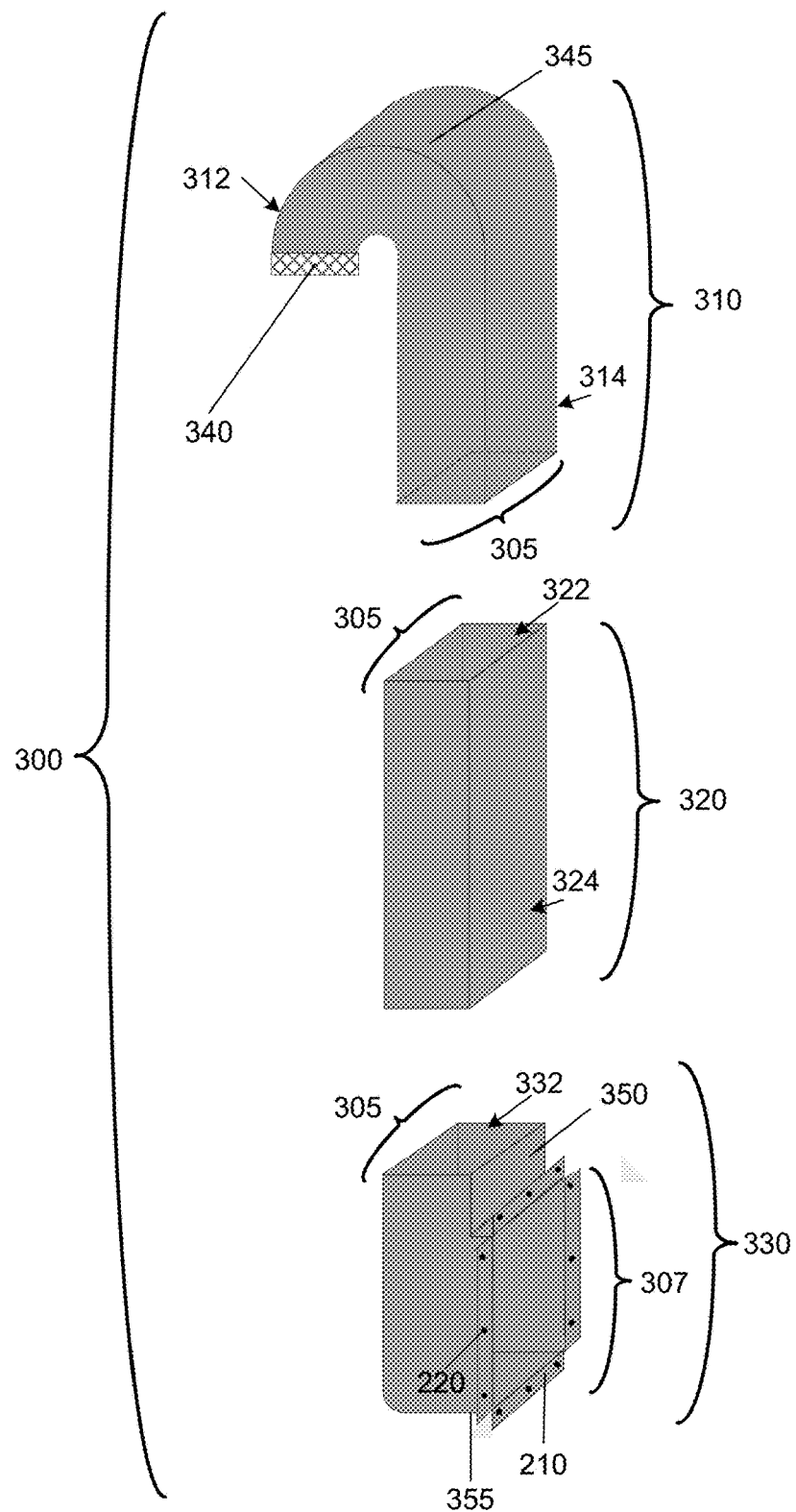

GENERATOR WITH VENT EXTENSION

BACKGROUND

A generator may be installed outside of a home or business and may provide backup power to the home or business in the event of an electrical power outage. The generator may be exposed to weather conditions during operation.

SUMMARY

In some examples vent extension systems are generally described. The systems may comprise a backup power generator. The backup power generator may include a housing. The housing may include first, second, third and fourth sides. The housing may include an intake vent on the first side, an exhaust vent on the second side, and an alternator vent on the third side. The backup power generator may include a motor effective to receive fuel and produce an output. The backup power generator may include an alternator configured to be in communication with the motor. The alternator may be effective to receive the output and produce electricity. The systems may comprise a first vent extension attached to the intake vent and a second vent extension attached to the exhaust vent. Each of the first and second vent extensions may include a first upper section. The first upper section may include a first tube defining a first channel with a first cross section. The first upper section may further include a bend in the first tube to prevent precipitation from entering into the first upper section. A first end of the first upper section may be on a first side of the bend in the first tube and a second end of the first upper section may be on a second side of the bend in the first tube. The second end of the first upper section may be longer than the first end of the first upper section and both the first end and the second end may define the first channel with the first cross section. Each of the first and second vent extensions may include a first lower section. The first lower section may include a second tube at a first end of the first lower section that defines a second channel with the first cross section. The first lower section may include a third tube with a bend, and a fourth tube at a second end of the first lower section that defines a third channel with a second cross section. The first end of the first lower section may be configured to connect to the second end of the first upper section. The systems may comprise a third vent extension attached to the alternator vent. The third vent extension may include a second upper section. The second upper section may include a fifth tube defining a fourth channel with a third cross section. The second upper section may further include a bend in the fifth tube to prevent precipitation from entering into the second upper section. A first end of the second upper section may be on a first side of the bend in the fifth tube and a second end of the second upper section may be on a second side of the bend in the fifth tube. The second end of the second upper section may be longer than the first end of the second upper section and both the first end and the second end of the second upper section may define the fourth channel with the third cross section. The third vent extension may include a second lower section. The second lower section may include a sixth tube at a first end of the second lower section that defines a fifth channel with the third cross section. The second lower section may include a seventh tube with a bend, and an eighth tube at a second end of the second lower section that defines a sixth channel with a fourth cross section. The first end of the second lower section may be configured to connect to the second end of the second upper section.

In some examples, methods to attach vent extensions to a backup power generator are generally described. The methods may comprise placing a sealant around an air intake vent of the backup power generator. The methods may comprise covering the air intake vent with a first end of a first vent extension. The first end of the first vent extension may include first flaps. The first flaps may extend out perpendicular to a base, a top, and sides of the first end of the first vent extension. The first flaps may include first bolt holes. The methods may comprise attaching the first vent extension to a housing of the backup power generator with bolts threaded through the first bolt holes. The methods may comprise placing a sealant around an exhaust vent of the backup power generator. The methods may comprise covering the exhaust vent with a first end of a second vent extension. The first end of the second vent extension may include second flaps. The second flaps may extend out perpendicular to a base, a top, and sides of the first end of the second vent extension. The second flaps may include second bolt holes. The methods may comprise attaching the second vent extension to the housing of the backup power generator with bolts threaded through the second bolt holes. The methods may comprise placing a sealant around an alternator vent of the backup power generator. The methods may comprise covering the alternator vent with a first end of a third vent extension. The first end of the third vent extension may include third flaps. The third flaps may extend out perpendicular to a base, a top, and sides of the first end of the third vent extension. The third flaps may include third bolt holes. The methods may comprise attaching the third vent extension to the housing of the backup power generator with bolts threaded through the third bolt holes.

In some examples, generator vent extension systems are generally described. The systems may comprise a backup power generator. The backup power generator may include a housing. The housing may include first, second, third and fourth sides. The housing may include an intake vent on the first side, an exhaust vent on the second side, and an alternator vent on the third side. The backup power generator may include a motor effective to receive fuel and produce an output. The backup power generator may include an alternator configured to be in communication with the motor. The alternator may be effective to receive the output and produce electricity. The systems may comprise a first vent extension attached to the intake vent and a second vent extension attached to the exhaust vent. Each of the first and second vent extensions may include a first upper section. The first upper section may include a first tube defining a first channel with a first cross section. The first upper section may further include a 180 degree bend in the first tube to prevent precipitation from entering into the first upper section. A first end of the first upper section may be on a first side of the bend in the first tube and a second end of the first upper section may be on a second side of the bend in the first tube. The second end of the first upper section may be longer than the first end of the first upper section. The first end of the first upper section may include a screen. Both the first end and the second end of the first upper section may define the first channel with the first cross section. Each of the first and second vent extensions may include a first lower section. The first lower section may include a second tube at a first end of the first lower section that defines a second channel with the first cross section. The first lower section may include a third tube with a bend, and a fourth tube at a second end of the first lower section that defines a third channel with a second cross section. The first end of the first lower section may be configured to connect to the second end of the first upper section. The systems may comprise a third vent extension attached to the alternator vent. The third vent extension may include a second upper section. The second upper section may include a fifth tube defining a fourth channel with a third cross section. The second upper section may further include a 180 degree bend in the fifth tube to prevent precipitation from entering into the second upper section. A first end of the second upper section may be on a first side of the bend in the fifth tube and a second end of the second upper section may be on a second side of the bend in the fifth tube. The second end of the second upper section may be longer than the first end of the second upper section. The first end of the second upper section may include a screen. Both the first end and the second end of the second upper section may define the fourth channel with the third cross section. The third vent extension may include a second lower section. The second lower section may include a sixth tube at a first end of the second lower section that defines a fifth channel with the third cross section. The second lower section may include a seventh tube with a bend, and an eighth tube at a second end of the second lower section that defines a sixth channel with a fourth cross section. The first end of the second lower section may be configured to connect to the second end of the second upper section.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 is a side perspective exploded view illustrating the components of a generator system including a generator with vent extensions; and FIG. 2 is a side perspective exploded view illustrating the components of a vent extension;

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 is a side perspective exploded view illustrating the components of a generator system including a generator with vent extensions, arranged in accordance with at least some embodiments presented herein. As discussed in more detail below, generator vent extensions may allow a generator to operate during adverse weather conditions.

Generator system 100 may include a generator 10, vent extensions 20a, 20b, and vent extension 30. Generator 10 may be a backup power generator and may include a motor 202, a housing 203 and an alternator 200. Motor 202 may be effective to receive fuel and produce an output. Alternator 209 may be in mechanical communication with motor 202 and may be effective to receive the output and produce electricity. Generator 10 may supply electrical power to a home or business 50 in the event of a power outage. Vent extensions 20a, 20b and vent extension 30 may include a composite material, metal, aluminum, tin, or any other construction material and/or combinations thereof. Vent extension 20a, 20b and vent extension 30 may each define a channel 22a, 22b, 32 respectively to allow air to flow through vent extensions 20a, 20b and vent extension 30 respectively. As described in more detail below, vent extensions 20a, 20b and vent extension 30 may allow ambient air to flow to generator 10 through vent extensions 20a, 20b, and 30 and exhaust air to flow away from generator 10 through vent extensions 20a, 20b, and 30.

Housing 203 of generator 10 may include an air intake vent 200 on a first side, an air exhaust vent 205 on a second side, and an alternator intake vent 207 on a third side. Air intake vent 200 may allow ambient air 260 to flow towards generator motor 202. Air exhaust vent 205 may allow exhaust air 270 from generator motor 202 to flow away from generator motor 202. Alternator intake vent 207 may allow ambient air 260 to flow towards alternator 209.

Vent extension 20a may be attached to housing 203 of generator 10 at a first end 222 of vent extension 20a so as to cover air intake vent 200. Ambient air 260 may flow into vent extension 20a at a second end 232 of vent extension 20a. Ambient air 260 may follow flow path 265 and flow through channel 22a of vent extension 20a to intake vent 200. Vent extension 20a may include flaps 210. Flaps 210 may extend out along a plane of an opening 212 at first end 222 of vent extension 20a and may be perpendicular to sides 224, base 226, and top 228 of first end 222 of vent extension 20a. Flaps 210 may include bolt holes 220. Bolts 240 may be threaded through bolt holes 220 and used to attach vent extension 20a to housing 203 of generator 10. A sealant 230 may be placed around intake vent 200 and between housing 203 of generator 10 and vent extension 20a prior to attaching vent extension 20a to housing 203 of generator 10 with bolts 240. Sealant 230 may be air tight and may include caulking, weather-stripping or a gasket. Vent extension 20a may further be secured to generator 10 with a support bracket 250. Support bracket 250 may secure vent extension 20a to a side of generator 10, the top of generator 10, vent extension 20b, vent extension 30, or any combination thereof.

When desired, vent extension 20a may be removable from generator 10 by removing support bracket 250 and bolts 240.

Vent extension 20b may be attached and secured to housing 203 of generator 10 on a first end 223 of second vent extension 20b so as to cover air exhaust vent 205. Exhaust air 270 may flow into vent extension 20b at first end 223 of second vent extension 20b. Exhaust air 270 may follow flow path 275 and flow through channel 22b of vent extension 20b and out second end 233 of vent extension 20b to ambient air. Vent extension 20b may likewise include flaps 210 extending out along the plane of an opening at first end 223 of second vent extension 20b. Flaps 210 may be perpendicular to the sides of second vent extension 20b and may include bolt holes 220. Bolts 240 may be threaded through bolt holes 220 and used to attach vent extension 20b to housing 203 of generator 10. Sealant 230 may be placed around air exhaust vent 205 and between housing 203 of generator 10 and vent extension 20b prior to attaching vent extension 20b to housing 203 of generator 10 with bolts 240. Vent extension 20b may further be secured to generator 10 with a support bracket 250. When desired, vent extension 20b may be removable from generator 10 by removing support bracket 250 and bolts 240.

Vent extension 30 may similarly be attached to housing 203 of generator 10 on a first end 235 of vent extension 30 so as to cover alternator vent 207. Ambient air 260 may flow into vent extension 30 at a second end 236 of vent extension 30. Ambient air 260 may follow flow path 268 and flow through channel 32 of vent extension 30 to alternator vent 207. Vent extension 30 may include flaps 215 perpendicular to the sides of vent extension 30 with bolt holes 220. Bolts 240 may be threaded through bolt holes 220 and used to attach vent extension 30 to housing 203 of generator 10. Sealant 230 may be placed around alternator vent 207 and between housing 203 of generator 10 and vent extension 30 prior to attaching vent extension 30 to housing 203 of generator 10 with bolts 240. Vent extension 320 may further be secured to generator 10 with a support bracket 250. When desired, vent extension 30 may be removable from generator 10 by removing support bracket 250 and bolts 240.

FIG. 2 is a side perspective exploded view illustrating the components of a vent extension, arranged in accordance with at least some embodiments presented herein. Those components in FIG. 2 that are labeled identically to components in FIG. 1 will not be described again for the purposes of clarity.

Vent extension 300 may be any of vent extension 20a, 20b, or 30. Vent extension 300 may include an upper section 310, a middle section 320 and a lower section 330. Upper section 310, middle section 320 and lower section 330 may each essentially define a rectangular cross section 305. Upper section 310 may be configured to connect to a first side of middle section 320 or to a first side of lower section 330. Middle section 320 may be configured to connect to upper section 310 on a first side of middle section 320 or to lower section 330 on a second side of middle section 320. Lower section 330 may be configured to connect to upper section 310 or to second side of lover section 320. Vent extension 300 may include an upper section 310 connected to a middle section 320 connected to a lower section 330. Vent extension 300 may include an upper section 310 connected to only a lower section 330. Vent extension 300 may include an upper section 310 connected to a first middle section 320 connected to a second middle section 320 connected to a lower section 330. Middle section(s) 320 may be used to adjust an overall length of vent extension 300 to a desired height. For example, if a large snowfall is forecast, vent extension 300 may include more than one middle section 320 in order for vent extension 300 to allow ambient air above expected snow level to flow to the generator.

Upper section 310 may be a tube defining an essentially rectangular cross section 305. Upper section 310 may include a bend 345 in upper section 310. Bend 345 may be from about 90 degrees to 210 degrees. Bend 345 may be 180 degrees may form a candy cane shape in the upper section 310. Upper section 310 may include a shorter top end 312 of upper section 310 on a first side of bend 345 and a longer bottom end 314 of upper section 310 on a second side of section 310. Bend 345 may prevent precipitation from entering into upper section 310 and vent extension 300. Top end 312 of upper section 310 may include a screen 340. Screen 340 may completely cover an opening at top end 312 of upper section 310 and may prevent vermin, insects and/or debris from entering into section 310. Screen 340 may be metal, composite, nylon, or any other screen material and/or combinations thereof. Bottom end 314 of section 310 may be configured to connect to a top end 322 of middle section 320 or a top end 332 of lower section 330.

Middle section 320 may be a straight tube defining the essentially rectangular cross section 305. A top end 322 of middle section 320 may be configured to connect to the bottom end 314 of upper section 310. A bottom end 324 of middle section 320 may be configured to connect to a top end 332 of lower section 330 and/or a top end 322 of middle section 320. Middle section 320 may be connected between upper section 310 and lower section 330 to increase a total height of vent extension 300. A height of middle section 320 may be varied as required. In some examples multiple middle sections 320 may be connected together between upper section 310 and lower section 330. In another example, upper section 310 may be connected to lower section 330 without a middle section 320.

Lower section 330 may include a tube defining the essentially rectangular cross section 305 on a first end 350 of lower section 330. Lower section 330 may form an L-shape with first end 350 of lower section 330 forming the top of the L-shape, a tube with bend, for example, a 90 degree turn, and a second end 355 of lower section 330 forming the base of the L-shape. Second end 355 of lower section 330 may be a tube defining an essentially rectangular cross section 307. Rectangular cross section 307 may encompass an area comparable to a vent on a generator. Second end 335 of lower section 330 may cover an area of a vent on a generator. Lower section 330 may include flaps 210 which may extend out along the plane of cross section 307. Flaps 210 may be perpendicular to the sides of lower section 330 and may include bolt holes 220. Bolt holes 220 may allow lower section 330 to be attached to a generator. A top end 332 of lower section 330 may be configured to connect to the bottom end 314 of upper section 310 or a bottom end 324 of middle section 320.

A system in accordance with the present disclosure may enable a generator to run when snow accumulations are higher than the generator vent height. Vent extensions may allow air above a level of snow to be flowed to the intake and alternator vents and may also allow exhaust gas to flow away from the generator. Vent extensions may be easy to install and may be seasonally installed to insure generator operation during snowy seasons while being removed during seasons without snow.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A generator vent extension system, the system comprising:
a backup power generator, wherein the backup power generator includes:
a housing including first, second, third and fourth sides, wherein the housing includes an intake vent on the first side, an exhaust vent on the second side, and an alternator vent on the third side;
a motor effective to receive fuel and produce an output;
an alternator configured to be in communication with the motor, the alternator effective to receive the output and produce electricity;
a first vent extension attached to the intake vent and a second vent extension attached to the exhaust vent, wherein each of the first and second vent extensions include:
a first upper section, where the first upper section includes a first tube defining a first channel with a first cross section and the first upper section further includes a bend in the first tube to prevent precipitation from entering into the first upper section, a first end of the first upper section being on a first side of the bend in the first tube and a second end of the first upper section being on a second side of the bend in the first tube, wherein the second end of the first upper section is longer than the first end of the first upper section and both the first end and the second end define the first channel with the first cross section; and
a first lower section, where the first lower section includes a second tube at a first end of the first lower section that defines a second channel with the first cross section, a third tube with a bend, and a fourth tube at a second end of the first lower section that defines a third channel with a second cross section, wherein the first end of the first lower section is configured to connect to the second end of the first upper section;
a third vent extension attached to the alternator vent, wherein the third vent extension includes:
a second upper section, where the second upper section includes a fifth tube defining a fourth channel with a third cross section and the second upper section further includes a bend in the fifth tube to prevent precipitation from entering into the second upper section, a first end of the second upper section being on a first side of the bend in the fifth tube and a second end of the second upper section being on a second side of the bend in the fifth tube, wherein the second end of the second upper section is longer than the first end of the second upper section and both the first end and the second end of the second upper section define the fourth channel with the third cross section; and
a second lower section, where the second lower section includes a sixth tube at a first end of the second lower section that defines a fifth channel with the third cross section, a seventh tube with a bend, and an eighth tube at a second end of the second lower section that defines a sixth channel with a fourth cross section, wherein the first end of the second lower section is configured to connect to the second end of the second upper section.

2. The system of claim 1, wherein the first, second, and third vent extensions include a composite material, metal, aluminum, tin, or any combination thereof.

3. The system of claim 1, wherein each of the first and second upper sections include a screen.

4. The system of claim 3, wherein the screen is metal, composite, nylon, or any combination thereof.

5. The system of claim 3, wherein the bend in the first tube is between 90 degrees to 210 degrees and the bend in the fifth tube is between 90 degrees to 210 degrees.

6. The system of claim 3, wherein the bend in the first tube is 180 degrees and the bend in the fifth tube is 180 degrees.

7. The system of claim 1, wherein each of the first lower sections further includes first flaps which extend out perpendicular to a base, a top, and sides of the second end of the first lower section and the second lower section further includes second flaps which extend out perpendicular to a base, a top, and sides of the second end of the second lower section.

8. The system of claim 7, wherein the first flaps and the second flaps each include bolt holes to attach the first, second and third vent extensions to the housing of the backup power generator.

9. The system of claim 8, wherein the first, second, and third vent extensions are each further secured to the backup power generator with a respective support bracket.

10. The system of claim 8, wherein a sealant is between the housing of the backup power generator and each of the first, second, and third vent extension devices prior to the securement of the first, second, and third vent extension devices to the housing of backup power generator.

11. The system of claim 1, wherein the first and second vent extensions includes:
at least one first middle section, where the first middle section includes a ninth tube defining a seventh channel with the first cross section, wherein a first end of the first middle section is configured to connect to the first end of the first lower section or the second end of the first middle section, and the second end of the first middle section is configured to connect to the second end of the first upper section or the first end of the first middle section, and the at least one first middle section is connected between the first upper section and the first lower section; and
wherein the third vent extension includes:
at least one second middle section, where the second middle section includes a tenth tube defining an eighth channel with the third cross section, wherein a first end of the second middle section is configured to connect to the first end of the second lower section or the second end of the second middle section, and the second end of the second middle section is configured to connect to the second end of the second upper section or the first end of the second middle section, and the at least one second middle section is connected between the second upper section and the second lower section.

12. A generator vent extension system, the system comprising:
a backup power generator, wherein the backup power generator includes:
a housing including first, second, third and fourth sides, wherein the housing includes an intake vent on the first side, an exhaust vent on the second side, and an alternator vent on the third side;
a motor effective to receive fuel and produce an output;

an alternator configured to be in communication with the motor, the alternator effective to receive the output and produce electricity a first vent extension attached to the intake vent and a second vent extension attached to the exhaust vent, wherein each of the first and second vent extensions include:

a first upper section, where the first upper section includes a first tube defining a first channel with a first cross section and the first upper section further includes a 180 degree bend in the first tube to prevent precipitation from entering into the first upper section, a first end of the first upper section being on a first side of the bend in the first tube and a second end of the first upper section being on a second side of the bend in the first tube, wherein the second end of the first upper section is longer than the first end of the first upper section, the first end of the first upper section includes a screen, and both the first end and the second end define the first channel with the first cross section; and a first lower section, where the first lower section includes a second tube at a first end of the first lower section that defines a second channel with the first cross section, a third tube with a bend, and a fourth tube at a second end of the first lower section that defines a third channel with a second cross section, wherein the first end of the first lower section is configured to connect to the second end of the first upper section;

a third vent extension attached to the alternator vent, wherein the third vent extension includes:

a second upper section, where the second upper section includes a fifth tube defining a fourth channel with a third cross section and the second upper section further includes a 180 degree bend in the fifth tube to prevent precipitation from entering into the second upper section, a first end of the second upper section being on a first side of the bend in the fifth tube and a second end of the second upper section being on a second side of the bend in the fifth tube, wherein the second end of the second upper section is longer than the first end of the second upper section, the first end of the second upper section includes a screen, and both the first end and the second end of the second upper section define the fourth channel with the third cross section; and a second lower section, where the second lower section includes a sixth tube at a first end of the second lower section that defines a fifth channel with the third cross section, a seventh tube with a bend, and an eighth tube at a second end of the second lower section that defines a sixth channel with a fourth cross section, wherein the first end of the second lower section is configured to connect to the second end of the second upper section.

13. The system of claim 12, wherein the first, second, and third vent extensions include a composite material, metal, aluminum, tin, or any combination thereof.

* * * * *